US008788255B2

(12) United States Patent
Kanno

(10) Patent No.: US 8,788,255 B2
(45) Date of Patent: Jul. 22, 2014

(54) DELAY ANALYSIS PROCESSING OF SEMICONDUCTOR INTEGRATED CIRCUIT

(75) Inventor: Koji Kanno, Tokyo (JP)

(73) Assignee: NEC Corporation, Tokyo (JP)

(*) Notice: Subject to any disclaimer, the term of this patent is extended or adjusted under 35 U.S.C. 154(b) by 244 days.

(21) Appl. No.: 12/859,722

(22) Filed: Aug. 19, 2010

(65) Prior Publication Data

US 2011/0046937 A1 Feb. 24, 2011

(30) Foreign Application Priority Data

Aug. 21, 2009 (JP) ................ P2009-191845

(51) Int. Cl.
G06F 17/50 (2006.01)

(52) U.S. Cl.
USPC ............ 703/19; 703/14; 703/13; 703/15; 703/16; 716/132; 716/113; 716/134; 716/115; 716/118

(58) Field of Classification Search
None
See application file for complete search history.

(56) References Cited

U.S. PATENT DOCUMENTS

| | | | | |
|---|---|---|---|---|
| 5,883,814 | A * | 3/1999 | Luk et al. | 716/104 |
| 7,418,679 | B1 * | 8/2008 | Vashi et al. | 716/108 |
| 2004/0060019 | A1 * | 3/2004 | Secatch et al. | 716/6 |
| 2006/0247875 | A1 * | 11/2006 | Ooshima | 702/79 |
| 2007/0033561 | A1 * | 2/2007 | Jones et al. | 716/6 |
| 2008/0229266 | A1 * | 9/2008 | Bueti et al. | 716/6 |

FOREIGN PATENT DOCUMENTS

| | | |
|---|---|---|
| JP | 2000100948 A | 4/2000 |
| JP | 2000172738 A | 6/2000 |
| JP | 21100223578 A | 8/2000 |
| JP | 2000242675 A | 9/2000 |
| JP | 2000243846 A | 9/2000 |
| JP | 2000250950 A | 9/2000 |
| JP | 2000259686 A | 9/2000 |
| JP | 2000305966 A | 11/2000 |
| JP | 2001273338 A | 10/2001 |
| JP | 2008296387 A | 10/2003 |
| JP | 2003337844 A | 11/2003 |
| JP | 2005044854 A | 2/2005 |
| JP | 2005235804 A | 9/2005 |
| JP | 2005284826 A | 10/2005 |

(Continued)

OTHER PUBLICATIONS

Translation of Japan Patent Application JP 2003-296387, 2003.*

(Continued)

*Primary Examiner* — Omar Fernandez Rivas
*Assistant Examiner* — Cuong Luu
(74) *Attorney, Agent, or Firm* — Sughrue Mion, PLLC

(57) ABSTRACT

A delay analysis device composed of a storage device and a data processing device analyzes a chip fabricating a semiconductor integrated circuit. Delay calculation is performed via an RC simulation with reference to a layout-implemented macro net list, macro layout data, and a cell timing library, thus producing macro delay information. An initial stage of a macro is annotated by the global clock path delay information including the edge information so as to produce a global clock delay-annotated macro net list, which is then converted into a macro delay-annotated net list. Based on the macro delay-annotated net list and timing constraint, the delay analysis device calculates delay times of signal paths and clock paths as well as clock skews with a high precision. It checks whether or not the relationship between the delay times of signal paths and clock paths meets the timing constraint, thus producing delay analysis information.

4 Claims, 12 Drawing Sheets

(56) References Cited

FOREIGN PATENT DOCUMENTS

| | | |
|---|---|---|
| JP | 2006039621 A | 2/2006 |
| JP | 2007034668 A | 2/2007 |
| JP | 2007257293 A | 10/2007 |
| JP | 2008009787 A | 1/2008 |

OTHER PUBLICATIONS

Translation of Japan Patent Application JP 2003-337844, 2003.*
Translation of Japan Patent Application JP 2005-044854, 2005.*
Japanese Office Action for JP2009-101845 issued Apr. 12, 2011.

* cited by examiner

FIG. 4
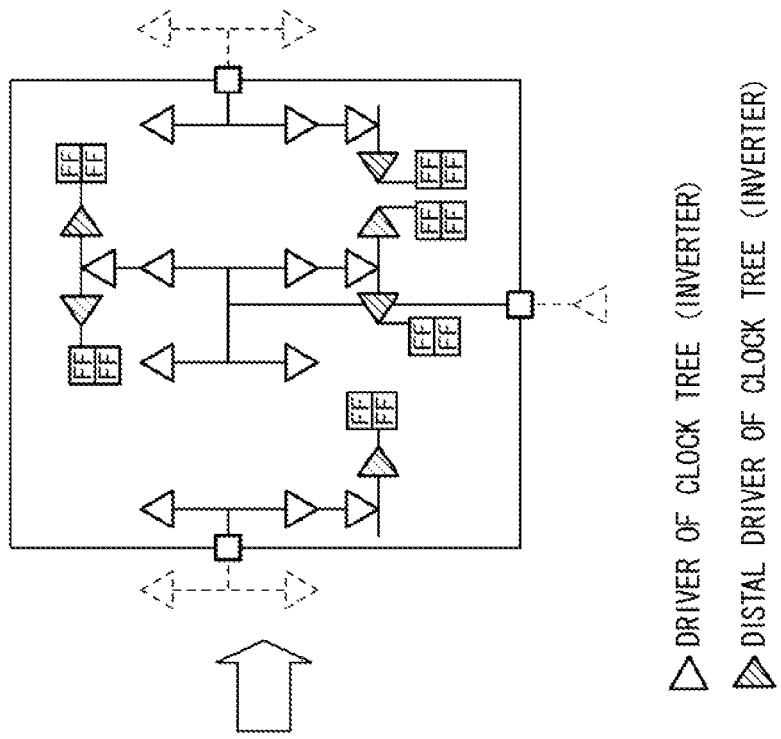
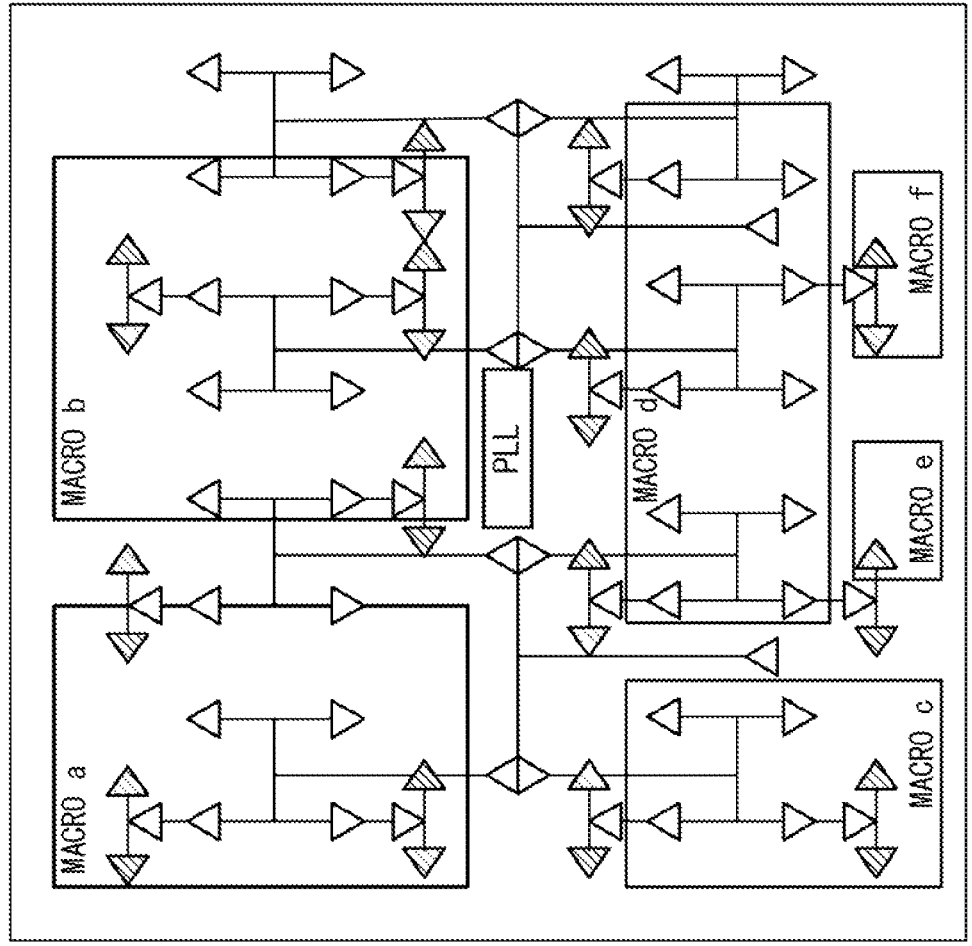
△ DRIVER OF CLOCK TREE (INVERTER)
◭ DISTAL DRIVER OF CLOCK TREE (INVERTER)

FIG. 12
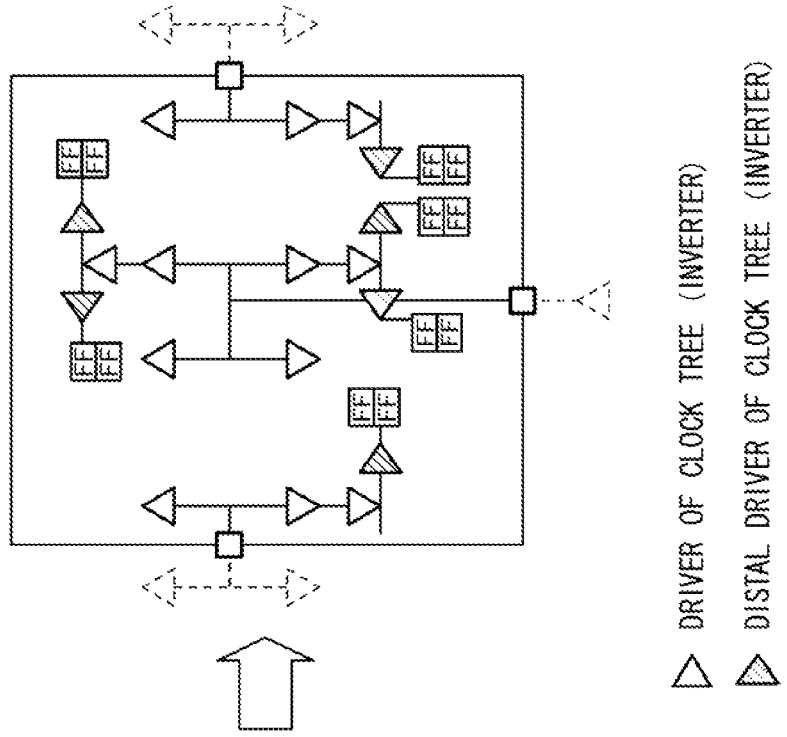
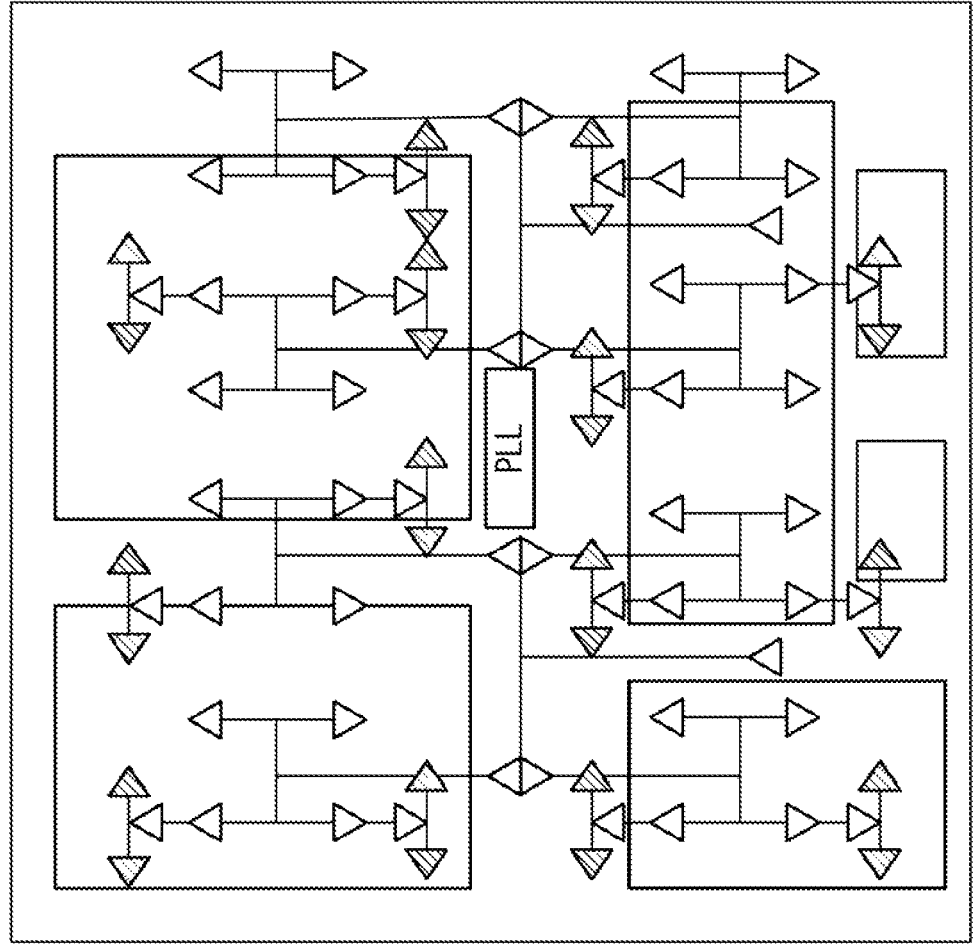

DELAY ANALYSIS PROCESSING OF SEMICONDUCTOR INTEGRATED CIRCUIT

The present application claims priority on Japanese Patent Application No. 2009-191845, the content of which is incorporated herein by reference.

BACKGROUND OF THE INVENTION

1. Field of the Invention

The present invention relates to delay analysis processing of semiconductor integrated circuits, and in particular to delay analysis devices, delay analysis methods, and delay analysis programs, all of which perform delay analysis processing on semiconductor integrated circuits subsequently to chip layouts so as to reduce clock skews.

2. Description of the Related Art

Due to the rapid increase in the sizes of LSI chips, a high machine performance and a large memory capacity are needed to handle EDA (Electronic Design Automation) tools; hence, it becomes difficult to entirely process LSI chips at once. To cope with the rapid increase in the sizes of LSI chips, a dominant manufacturing method has been developed to design a single LSI chip in units of hierarchical subdivisions of the circuitry (referred to as "macros"). After a chip layout, a part of the circuitry (referred to as "an arbitrary region") can be isolated from an LSI circuit and subjected to further processing. Since LSI chips are being rapidly developed to have high-speed performance, LSI chips serving as synchronization circuits, for example, need to secure concurrent operations among flip-flops (FF). In this case, it is important to reduce clock skews (i.e. significant differences of delay times between clock signals input to flip-flops) as low as possible. In the delay analysis processing on an arbitrary region of the hierarchical architecture of the circuitry or a part of the circuitry isolated from an LSI chip after a chip layout, it is necessary to remove design margins regarding clock skews (i.e. differences of delay times between clock signals) as much as possible. Due to the rapid increase in the sizes of LSI chips, a single LSI chip needs to be designed in units of macros in the hierarchical architecture of the circuitry. Alternatively, an arbitrary region of a single LSI chip is isolated and subjected to further processing subsequently to a chip layout.

FIG. 11 shows a clock distribution method in the hierarchical architecture of the circuitry, wherein clock distribution is performed in a top layout and a macro layout. A generally-known technique is to merge clock distribution of a top layout with clock distribution of a macro layout in further processing of chips. This clock distribution method suffers from a larger clock skew due to a large number of stages needed to establish synchronization on each chip entirely. Specifically, FIG. 11 shows that a clock path c1 bypasses a macro m1 and leads to a macro m2, while a clock path c2 bypasses the macro m1 and leads to a macro m3, wherein it needs a large number of stages (i.e. a large number of drivers), which in turn increases a clock skew due to wiring delays and driver delays.

Another clock distribution method is developed in light of the above drawback, wherein clock distribution is performed on the entire surface of an LSI chip in a top process, while a macro process is performed on a certain number of clock paths which are laid in a macro and which are extracted from clock paths distributed on the entire surface of an LSI chip, whereby the clock distribution of the macro process is performed such that drivers at distal ends of a clock tree are simply connected to flip-flops (FF) in the macro as shown in FIG. 12. Compared with the foregoing clock distribution method, this clock distribution method is able to reduce the number of stages of a clock tree and to thereby reduce a clock skew. Patent Document 1 discloses one relevant technology.

Patent Document 1: Japanese Patent Application Publication No. 2003-296387
Patent Document 2: Japanese Patent Application Publication No. 2001-273338
Patent Document 3: Japanese Patent Application Publication No. 2006-39621
Patent Document 4: Japanese Patent Application Publication No. 2000-259686
Patent Document 5: Japanese Patent Application Publication No. 2000-305966
Patent Document 6: Japanese Patent Application Publication No. 2000-250950
Patent Document 7: Japanese Patent Application Publication No. 2008-9787
Patent Document 8: Japanese Patent Application Publication No. 2005-235804
Patent Document 9: Japanese Patent Application Publication No. 2000-243846
Patent Document 10: Japanese Patent Application Publication No. 2000-223578
Patent Document 11: Japanese Patent Application Publication No. 2000-172738
Patent Document 12: Japanese Patent Application Publication No. 2000-100948
Patent Document 13: Japanese Patent Application Publication No. 2007-257293
Patent Document 14: Japanese Patent Application Publication No. 2005-284826
Patent Document 15: Japanese Patent Application Publication No. 2007-34668
Patent Document 16: Japanese Patent Application Publication No. 2000-242675

In the clock distribution method of FIG. 12, a macro is isolated from an LSI chip having clock paths distributed on the entire surface and subjected to a macro process. When a macro is isolated without noticing the "physical" positional relationship of clock distribution, fragmentary clock paths whose clock terminals are laid in a macro boundary must be included in the macro being isolated from the LSI chip. In the macro process performed on a macro having fragmentary clock paths, it is difficult to adopt a high-precision clock skew in the macro delay analysis due to differences of clock paths having different numbers of stages included in clock trees, each of which leads from a clock source (PLL) of an LSI chip to clock terminals at a macro boundary. For this reason, it is necessary to adopt a large clock skew preventing an under-margined condition throughout an LSI chip; in other words, delay analysis must be performed based on an unnecessarily large clock skew, which is a bottleneck factor in terms of the optimum macro architecture of the circuitry. A similar drawback occurs when delay analysis is performed on an arbitrary region of the hierarchical architecture of the circuitry subsequently to a chip layout.

SUMMARY OF THE INVENTION

The invention seeks to solve the above problems, or to improve upon the problem at least in part.

It is an object of the present invention to provide a delay analysis device, a delay analysis method, and a delay analysis program, each of which performs the delay analysis processing on a semiconductor integrated circuit based on a high-precision clock skew.

A delay analysis device according to the present invention is designed to analyze a chip fabricating a semiconductor integrated circuit.

The delay analysis device is constituted of a delay calculation unit that performs delay calculation via an RC simulation with reference to a layout-implemented macro net list, macro layout data, and a cell timing library, thus producing macro delay information; a global clock delay annotation unit that inputs the layout-implemented macro net list and global clock path delay information including edge information so as to annotate the global clock path delay information including the edge information on an initial stage of a macro, thus producing a global clock delay-annotated macro net list; a macro delay annotation unit that inputs the global clock delay-annotated macro net list and the macro delay information so as to produce a macro delay-annotated net list; and a delay analysis unit that inputs the macro delay-annotated net list and timing constraint information so as to calculate a delay time of a signal path, a delay time of a clock path, and a clock skew, and to check whether or not the relationship between the delay time of the signal path and the delay time of the clock path meets the timing constraint information, thus producing delay analysis information.

Alternatively, the delay analysis device is constituted of a delay calculation unit that performs delay calculation via an RC simulation with reference to a layout-implemented regional net list, regional layout data, and a cell timing library, thus producing regional delay information; a global clock delay annotation unit that inputs the layout-implemented regional net list and global clock path delay information including edge information so as to annotate the global clock path delay information including the edge information on an initial stage of an arbitrary region, thus producing a global clock delay-annotated regional net list; a regional delay annotation unit that inputs the global clock delay-annotated regional net list and the regional delay information so as to output a regional delay-annotated net list; and a delay analysis unit that inputs the regional delay-annotated net list and timing constraint information so as to calculate a delay time of a signal path, a delay time of a clock path, and a clock skew, and to check whether or not the relationship between the delay time of the signal path and the delay time of the clock path meets the timing constraint information, thus producing delay analysis information.

A delay analysis method according to the present embodiment is constituted of a delay calculation step for performing delay calculation via an RC simulation with reference to a layout-implemented macro net list, macro layout data, and a cell timing library, thus producing macro delay information; a global clock delay annotation step for inputting the layout-implemented macro net list and global clock path delay information including edge information so as to annotate the global clock path delay information including the edge information on an initial stage of a macro, thus producing a global clock delay-annotated macro net list; a macro delay annotation step for inputting the global clock delay-annotated macro net list and the macro delay information so as to produce a macro delay-annotated net list; a delay analysis step for inputting the macro delay-annotated net list and timing constraint information so as to calculate a delay time of a signal path, a delay time of a clock path, and a clock skew, and for checking whether or not the relationship between the delay time of the signal path and the delay time of the clock path meets the timing constraint information, thus producing delay analysis information.

Alternatively, the delay analysis method is constituted of a delay calculation step for performing delay calculation via an RC simulation with reference to a layout-implemented regional net list, regional layout data, and a cell timing library, thus producing regional delay information; a global clock delay annotation step for inputting the layout-implemented regional net list and global clock path delay information including edge information so as to annotate the global clock path delay information including the edge information on an initial stage of an arbitrary region, thus producing a global clock delay-annotated regional net list; a regional delay annotation step for inputting the global clock delay-annotated regional net list and the regional delay information so as to output a regional delay-annotated net list; a delay analysis step for inputting the regional delay-annotated regional net list and the timing constraint information so as to calculate a delay time of a signal path, a delay time of a clock path, and a clock skew, and for checking whether or not the relationship between the delay time of the signal path and the delay time of the clock path meets the timing constraint information, thus producing delay analysis information.

A delay analysis program according to the present invention causes a computer to implement the delay analysis method including the delay calculation step, the global clock delay annotation step, the macro delay annotation step, and the delay analysis step.

Alternatively, the delay analysis program causes a computer to implement the delay analysis method including the delay calculation step, the global clock delay annotation step, the regional delay annotation step, and the delay analysis step.

The present invention has outstanding features and effects owing to a unique configuration in the delay analysis processing. Accordingly, in the macro delay analysis on one of subdivisions of the hierarchical architecture of the LSI circuitry or the regional delay analysis on an arbitrary region isolated from a chip layout, clock paths of a macro or arbitrary region are each annotated by the delay information of clock paths obtained in the chip layout or the top layout handling a macro or arbitrary region as a black box. Thus it is possible to preclude excessive design margins, which cannot be precluded in the conventional macro delay analysis or the conventional regional delay analysis, thus achieving the optimum LSI design.

BRIEF DESCRIPTION OF THE DRAWINGS

These and other objects, aspects, and embodiments of the present invention will be described in more detail with reference to the following drawings.

FIG. 4 shows a second procedure of clock distribution in connection with step S12 of the delay analysis processing shown in FIG. 2.

FIG. 12 shows another clock distribution method which aims at reducing a clock skew compared with the clock distribution method of FIG. 11.

DESCRIPTION OF THE PREFERRED EMBODIMENTS

The present invention will be described in further detail by way of examples with reference to the accompanying drawings.

1. First Embodiment

A delay analysis device for analyzing a semiconductor integrated circuit according to a first embodiment of the present invention will be described with reference to the accompanying drawings. The first embodiment refers to a clock distribution method of "H-Tree"; but this is not a restriction.

Figure 1:
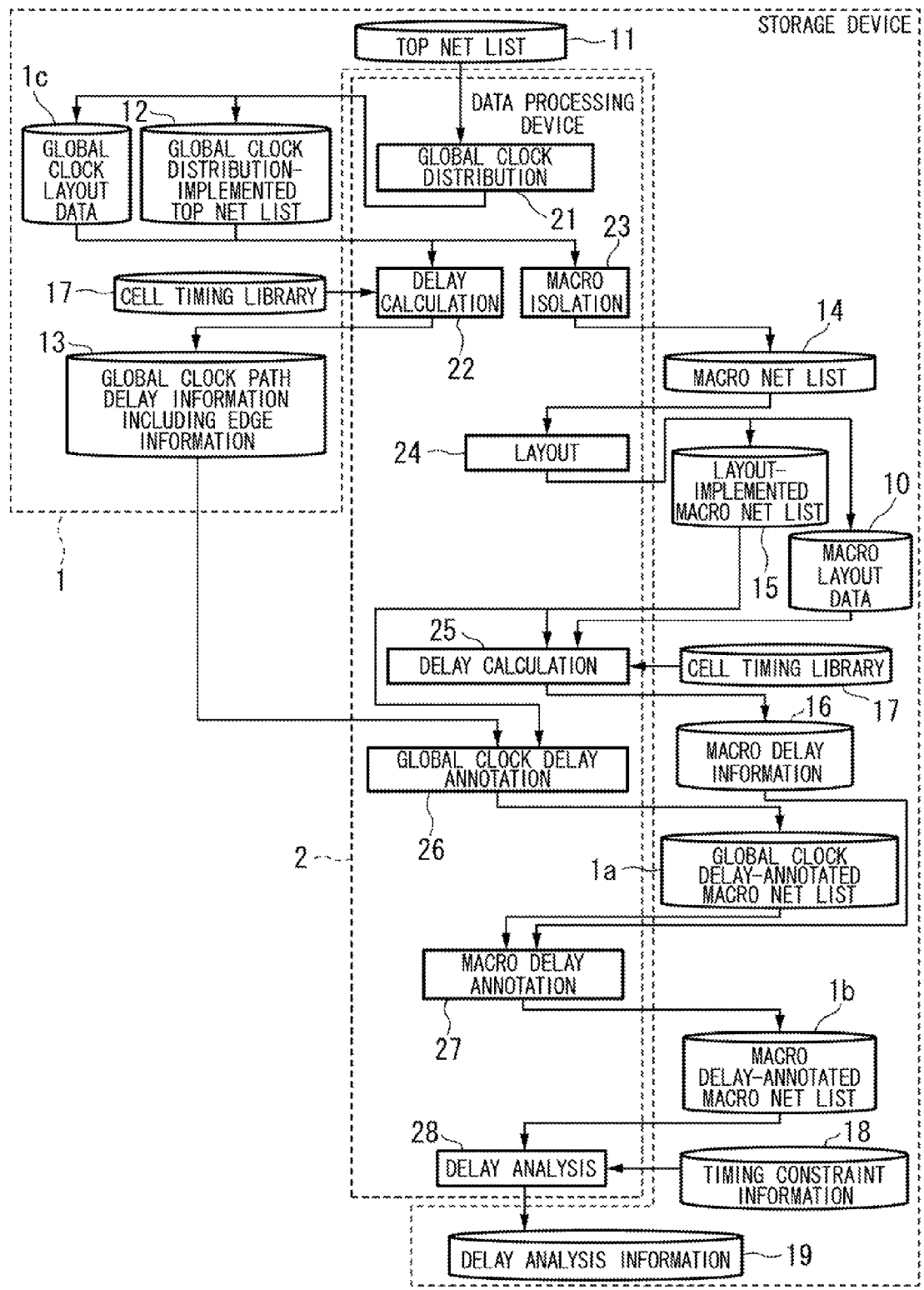
FIG. 1 is a block diagram showing a delay analysis device according to a first embodiment of the present invention.

FIG. 1 is a block diagram of the delay analysis device of the first embodiment, which is constituted of a storage device 1 (e.g. a hard-disk unit) and a data processing device 2 which operates in accordance with programs.

The storage device 1 stores various files representing a top net list 11, a cell timing library 17, and timing constraint information 18. In addition, the storage device 1 stores various files of output information such as a global clock distribution-implemented top net list 12, a global clock layout data 1c, a global clock path delay information 13 including edge information, a macro net list 14, a layout-implemented macro net list 15, a macro layout data 10, a macro delay information 16, a global clock delay-annotated macro net list 1a, a macro delay-annotated net list 1b, and delay analysis information 19.

The top net list 11 refers to the information of a net list output from a layout tool after completion of a primitive cell layout or a macro layout (i.e. a floor plan) when a macro serves as a low level of hierarchy. The top net list 11 retains the information representing a certain level of hierarchy including a macro boundary.

The cell timing library 17 retains a delay time occurring between an input terminal and an output terminal in each of cells serving as flip-flops (FF) or clock drivers as well as a setup time or a hold time of a clock signal applied to data input into the input terminal of each cell in advance. Patent Document 2 discloses a cell library corresponding to the cell timing library 17, while Patent Document 3 discloses a timing constraint library corresponding to the cell timing library 17.

The timing constraint information 18 includes a basic clock period (or a basic clock frequency serving as a constraint in operating a semiconductor integrated circuit), an external delay time adapted to input pins, an external delay time required by output pins, and a timing exception path (e.g. a false path or a multi-cycle path).

The global clock distribution-implemented top net list 12 refers to a net list showing that clock paths are distributed on the entire surface of a chip in the top net list 11 (see a left-side illustration of FIG. 12).

The global clock path delay information 13 including the edge information represents wiring delays and gate delays of global clock paths per each network and edges (i.e. rise/fall edges) of a clock signal reaching each clock cell. Considering inverters serving as clock cells, edges of a clock signal reaching each clock cell may differ dependent upon the number of stages of clock cells counted from a PLL.

The macro net list 14 refers to a net list regarding an internal circuit of a macro which is extracted from the global clock distribution-implemented top net list 12.

The layout-implemented macro net list 15 refers to a net list which is produced via a layout on the macro net list 14.

The macro delay information 16 represents wiring delays and gate delays in an internal circuit of a macro per each network.

The global clock delay-annotated macro net list 1a refers to an annotated macro net list in which an initial stage of a macro is annotated by the global clock path delay information with respect to the layout-implemented macro net list 15. Herein, the term "annotated" (or "annotation") refers to a procedure in which clock paths contained in a net list are each connected with the delay information and/or the edge information.

The macro delay-annotated net list 1b refers to an annotated macro net list in which first and subsequent stages of clock paths and other circuits of a macro are each annotated with the macro delay information with respect to the global clock delay-annotated macro net list 1a.

The delay analysis information 19 represents the frequency distribution statistical information per each default value representing a violation of timing constraint, which is determined by checking whether or not the relationship between the delay time of the signal path and the delay time of the clock path meets the timing constraint.

The data processing device 2 includes a global clock distribution unit 21, a delay calculation unit 22, a macro isolation unit 23, a layout unit 24, a delay calculation unit 25, a global clock delay annotation unit 26, a macro delay annotation unit 27, and a delay analysis unit 28.

The global clock distribution unit 21 inputs the top net list 11 so as to distribute clock paths on the entire surface of a chip, thus producing the global clock distribution-implemented top net list 12 and the global clock layout data 1c. Herein, a generally-applied technique is to perform shield wiring or adjacency-inhibiting wiring, thus preventing a delay of each clock path from being significantly increased in a subsequent layout procedure.

The delay calculation unit 22 inputs the global clock distribution-implemented top net list 12 and the global clock layout data 1c so as to perform delay calculation via an RC simulation with reference to the cell timing library 17, thus producing the global clock path delay information 13 including the edge information.

The macro isolation unit 23 inputs the global clock distribution-implemented top net list 12 so as to output the macro net list 14 with respect to an isolated portion of each macro.

The layout unit 24 inputs the macro net list 14, wherein it includes a process in which distal drivers of a clock tree, which is a destination of global clock distribution, are connected with flip-flops (FF) of each macro. The layout unit 24 produces the layout-implemented macro net list 15 and the macro layout data 10.

The delay calculation unit 25 inputs the layout-implemented macro net list 15 and the macro layout data 10 so as to perform delay calculation via an RC simulation with reference to the cell timing library 17, thus producing the macro delay information 16.

The global clock delay annotation unit 26 inputs the layout-implemented macro net list 15 and the global clock path delay information 13 including the edge information so as to annotate the delay information, which is extracted from the global clock path delay information 13 including the edge information, on an initial stage of a macro, thus outputting the global clock delay-annotated macro net list 1a. Considering inverters serving as clock cells, a clock path is annotated by the edge information in addition to the delay information, since edges (i.e. rise/fall edges) of a clock signal input into a macro may differ via clock paths when the number of clock cells varies outside the macro.

The macro delay annotation unit 27 inputs the global clock delay-annotated macro net list 1a and the macro delay information 16 so as to annotate the macro delay information on first and subsequent stages of clock paths and other circuits of a macro, other than the foregoing circuit which is annotated by the delay information in the global clock delay annotation unit 26, thus outputting the macro delay-annotated net list 1b.

The timing constraint unit 18 calculates delay times of clock paths, calculates clock skews, and checks whether or not the relationship between a clock path delay time and a signal path delay time meets the timing constraint, thus producing the delay analysis information 19.

Figure 2:
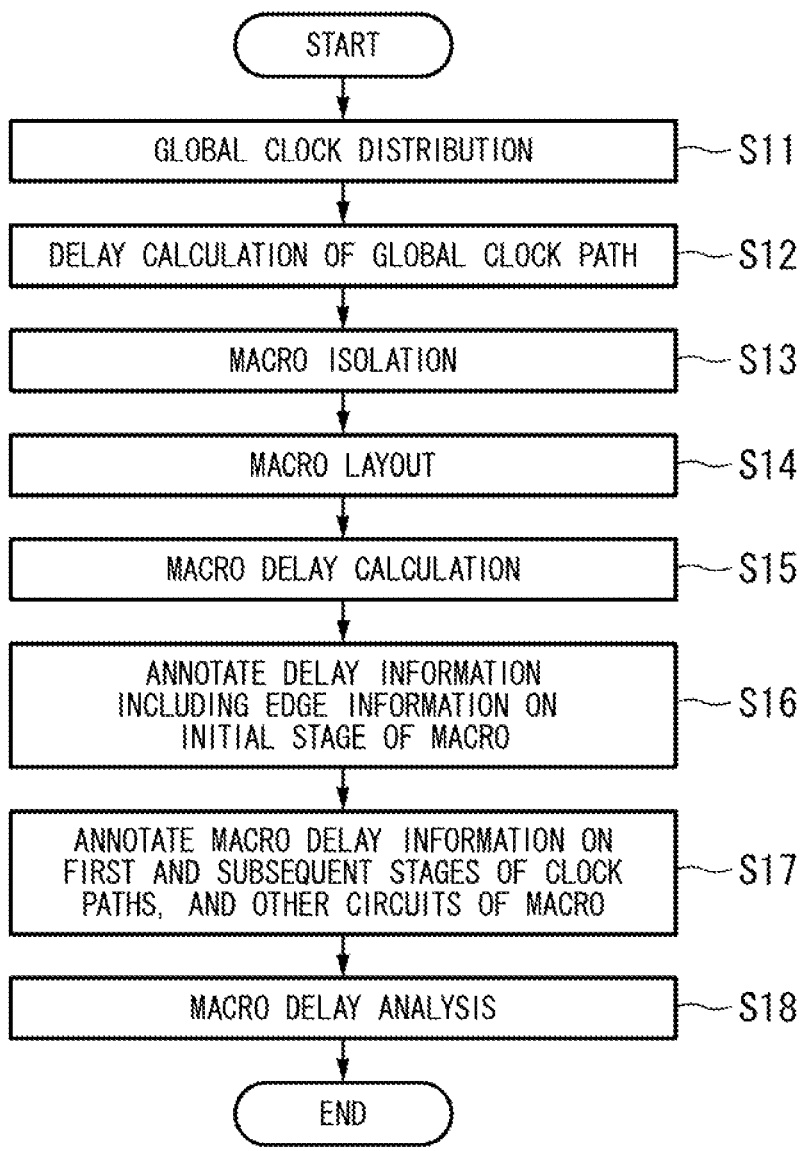
FIG. 2 is a flowchart showing delay analysis processing according to the first embodiment.

FIG. 2 is a flowchart showing a flow of processing executed in the delay analysis device of the first embodiment. Next, the delay analysis processing considering clock delays outside a macro will be described with reference to FIG. 2.

(Step S11)

Figure 3:
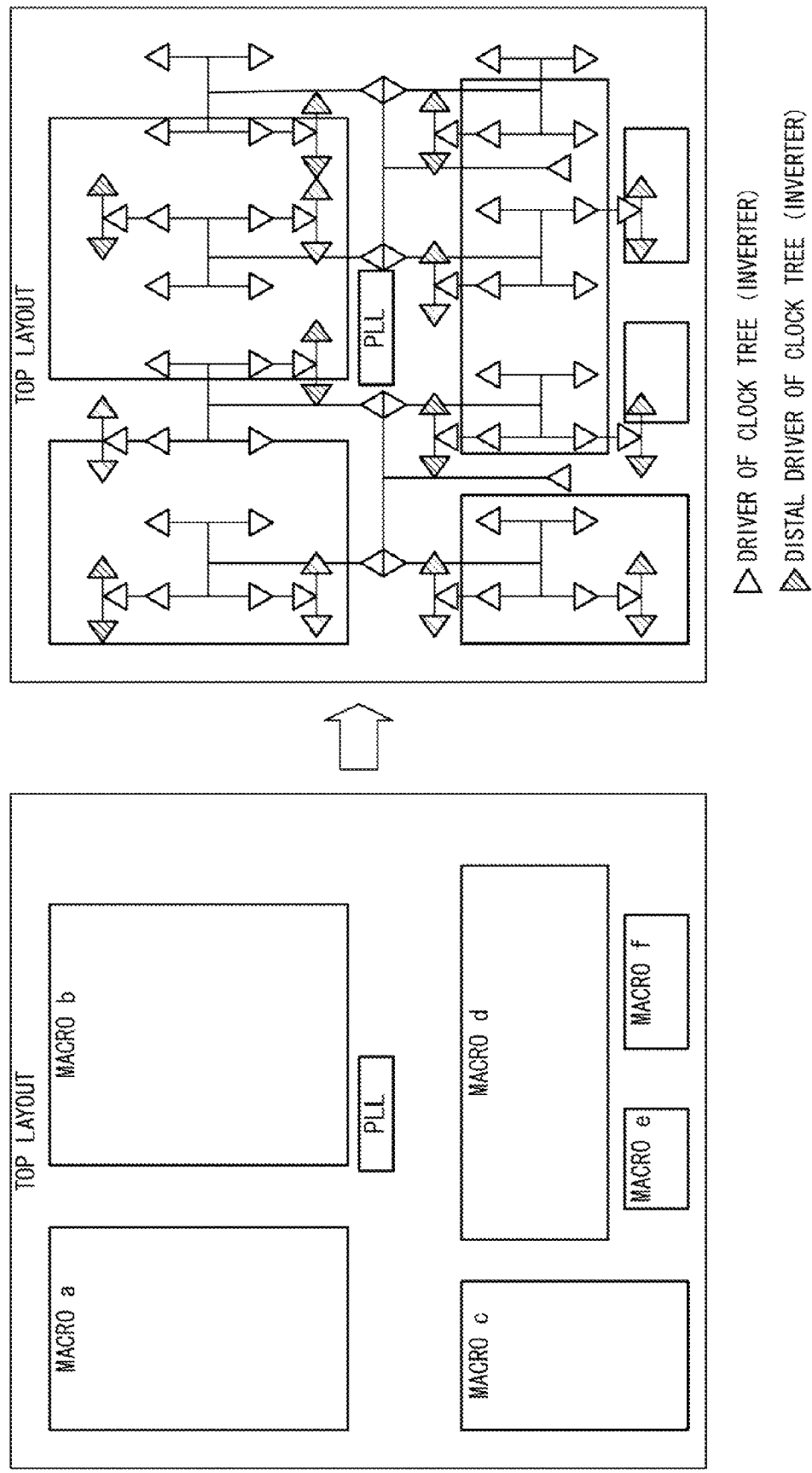
FIG. 3 shows a first procedure of clock distribution in connection with step S11 of the delay analysis processing shown in FIG. 2.

The global clock distribution unit 21 inputs the top net list 11. The global clock distribution unit 21 does not perform a generally-known procedure of clock distribution of the top layout prior to a macro boundary but performs an overall procedure for distributing clock paths onto the entire surface of a chip including an internal area of a macro as shown in FIG. 3, wherein it outputs the global clock distribution-implemented top net list 12 and the global clock layout data 1c.

(Step S12)

The delay calculation unit 12 inputs the global clock distribution-implemented top net list 12 and the global clock layout data 1c so as to perform delay calculation via an RC simulation with reference to the cell timing library 17, thus outputting the global clock path delay information 13 including the edge information. The step S12 of the delay calculation unit 22 can be realized by known techniques disclosed in Patent Document 2, Patent Document 4, Patent Document 5, and Patent Document 6.

(Step S13)

The macro isolation unit 23 inputs the global clock distribution-implemented top net list 12 so as to output the macro net list 14 with regard to an isolated portion of macro as shown in FIG. 4. Since clock paths are physically distributed onto the entire surface of a chip in step S11, external clock terminals outside the macro are disposed at intersecting points between clock paths and the macro boundary so that the macro including external clock terminals is isolated in step S12. The step S13 except for cutting out of clock terminals can be realized by known techniques disclosed in Patent Document 7 and Patent Document 8. In this connection, a specific prefix is added to an instance name for a first stage of a clock cell in a macro so that the first stage of the clock cell can be easily discriminated in the macro in subsequent steps.

(Step S14)

The layout unit 24 inputs the macro net list 14 so as to output the layout-implemented macro net list 15 and the macro layout data 10. In step S14, distal drivers of a clock tree are connected with clock input terminals of flip-flops (FF) of a macro via clock paths. This completes distribution of clock paths leading from clock sources to flip-flops (FF). The step S14 (for arranging clock paths leading from distal drivers of a clock tree to clock input terminals of flip-flops) can be realized by Patent Document 9, Patent Document 10, Patent Document 11, and Patent Document 12.

(Step S15)

The delay calculation unit 25 inputs the layout-implemented macro net list 15 and the macro layout data 10 so as to perform delay calculation via an RC simulation with reference to the cell timing library 17, thus outputting the macro delay information 16. The step S15 can be realized by known techniques disclosed in Patent Document 2, Patent Document 4, Patent Document 5, and Patent Document 6.

(Step S16)

The global clock delay annotation unit 26 inputs the layout-implemented macro net list 15 and the global clock path delay information 13 including the edge information, thus the global clock delay-annotated macro net list 1a. Herein, an initial stage of a macro is annotated by the global clock path delay information 13 including the edge information. Specifically, a global clock path delay regarding an initial stage of a macro is annotated as a clock path delay time between an isolated portion of macro and the initial stage of the macro.

Figure 5:
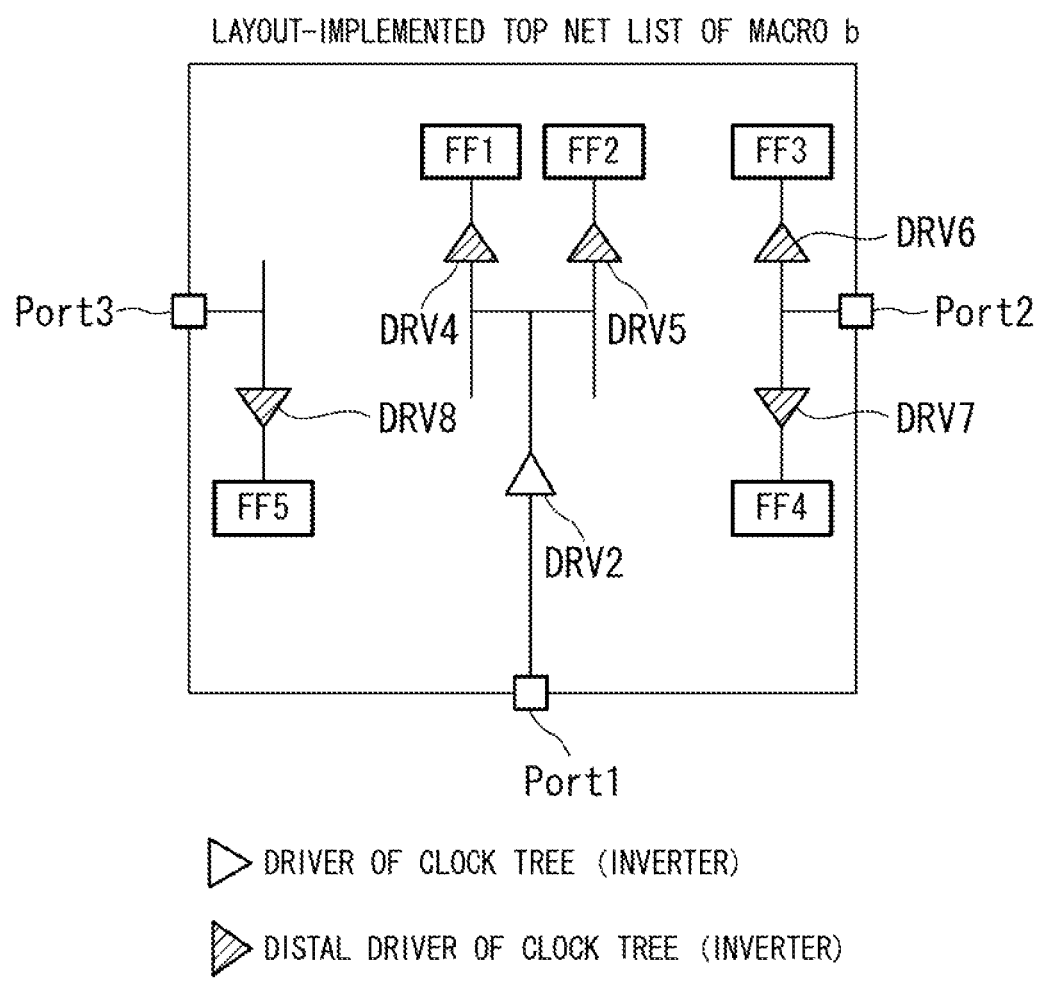
FIG. 5 shows a layout-implemented macro net list with respect to a macro b.

The details of step S16 will be described with reference to FIGS. 5 and 6. FIG. 5 shows a layout-implemented macro net list for a macro b which is a subject of the delay analysis processing, and FIG. 6 shows the outline of the delay analysis processing executed by the delay analysis device in terms of operations.

As shown in FIG. 5, the macro b includes external clock input terminals Port1 to Port3, a driver DRV2, distal drivers DRV4 through DRV8, and flip-flops FF1 through FF5. Herein, DRV2 and DRV4 through DRV8 denote clock drivers. The macro b is a circuit combining the constituent elements shown in FIG. 5.

In step S16, an initial stage of the macro b is annotated by the delay information including the edge information. That is, a clock path of Port1→DRV2 (which leads from the external clock input terminal Port1 to the distal driver DRV2), a clock path of Port2→DRV6, DRV7 (which leads from the external clock input terminal Port2 to the distal drivers DRV6, DRV7), and a clock path of Port3→DRV8 (which leads from the external clock input terminal Port3 to the distal driver DRV8) are each annotated with the delay information. There are also annotated by an identification of either a rise edge or a fall edge of a clock signal reaching each of input terminals of the distal drivers DRV2 and DRV4 through DRV8.

Figure 6:
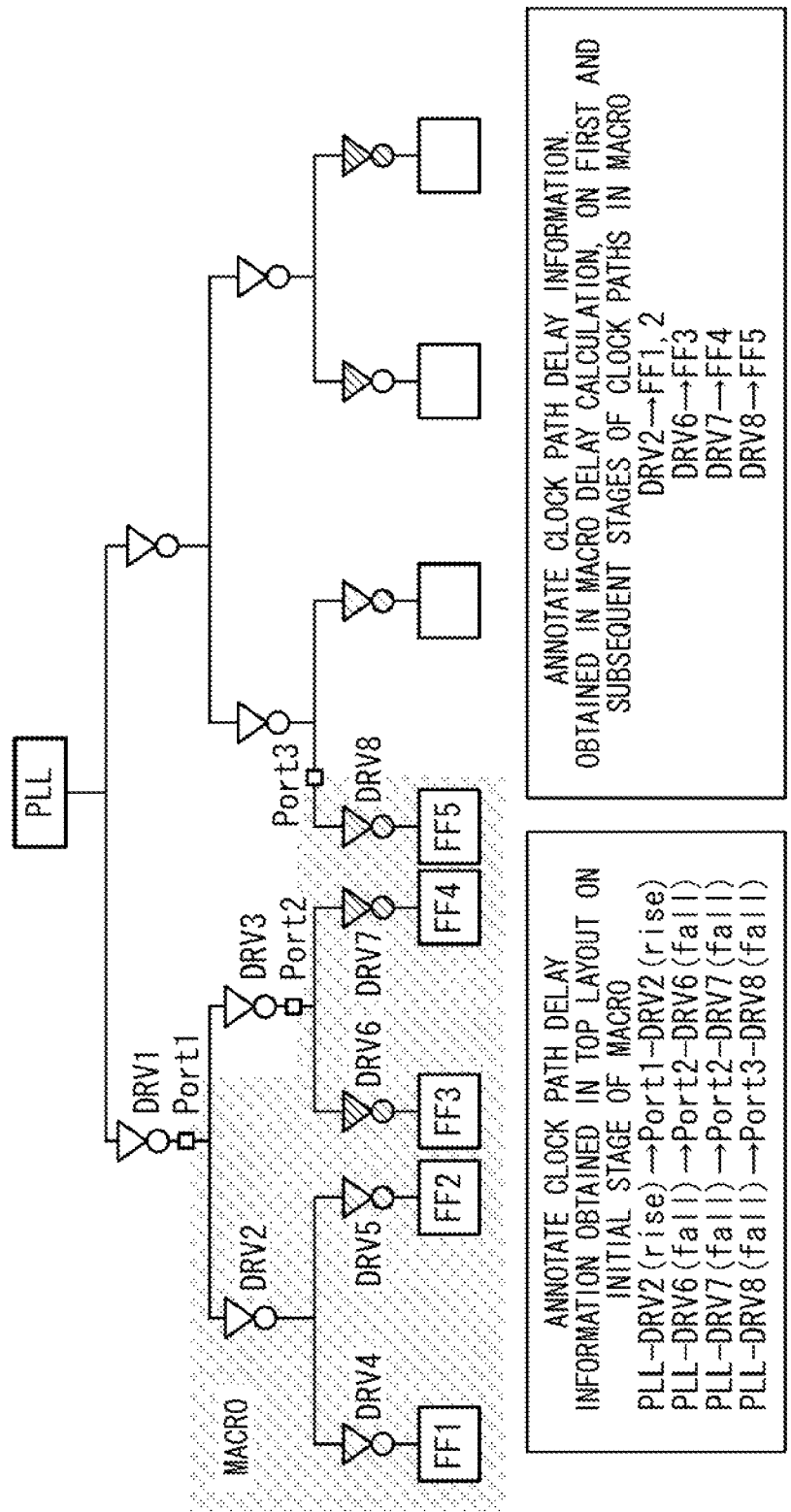
FIG. 6 shows the outline of the delay analysis processing of the first embodiment in terms of operations.

With respect to a driver DRV2 in FIG. 6, a delay time of a clock path of PLL→DRV2 (which leads from a PLL to the driver DRV2) designated by the global clock path delay information 13 including the edge information is annotated as a delay time of a clock path of Port1→DRV2 of a macro. Considering different numbers of clock cells laid outside a macro, it is necessary to annotate the edge information in addition to the delay information owing to a distinction of rise/fall edges of a clock signal (entering into the macro) dependent upon each clock path. It is possible to discriminate the initial stage of the macro b by use of the prefix which is added to the instance name in step S13.

(Step S17)

The macro delay annotation unit 27 inputs the global clock delay-annotated macro net list 1a and the macro delay information 16, thus outputting the macro delay-annotated net list 1b. Thus, first and subsequent stages of clock paths and other circuits of a macro are annotated by the macro delay information 16. In other words, circuits other than the circuit which is already annotated by the delay information in step S16 are annotated by the delay information with reference to the macro delay information 16. Through steps S16 and S17, it is possible to completely annotate the delay information on the entire area of a macro.

(Step S18)

The delay analysis unit 28 inputs the layout-implemented macro net list 15 (i.e. a macro net list already annotated by the macro delay information 16) and the timing constraint information 18 so as to calculate delay times of signal paths, delay times of clock paths, and clock skews in light of clock delay times occurring outside a macro and to check whether or not the relationship between delay times of clock paths and delay times of signal paths meets the timing constraint, thus outputting the delay analysis information 19. The clock path delay information retains a delay time of a clock path of a top layout, i.e. a delay time of a clock path leading from a PLL to a first stage of a driver of a clock tree in each macro; hence, although the macro delay analysis originates from the macro layout, it ensures a high-precision calculation of clock skews as the top layout. The delay analysis processing is performed using a high-precision clock skew so as to produce the delay analysis information 19. A macro delay analysis is performed using the correct information with respect to edges of a clock signal. This completes the delay analysis of the macro b.

The macro delay analysis allows a delay analysis tool to recognize a clock path delay time outside a macro annotated on the global clock path delay information obtained from the top layout; hence, although the macro delay analysis originates from the macro layout, it ensures a high-precision calculation of clock skews as in the top layout. This makes it possible to exclude excessive design margins, which cannot be excluded from the conventional macro delay analysis, thus achieving the optimum LSI architecture.

Since the macro layout is annotated by a set of the clock path delay information and the edge information, even when a plurality of cut ends appears in clock paths so that the number of clock drivers differs per each clock path, it is possible to annotate calculation results of clock path delay times on the macro layout.

Figure 7:
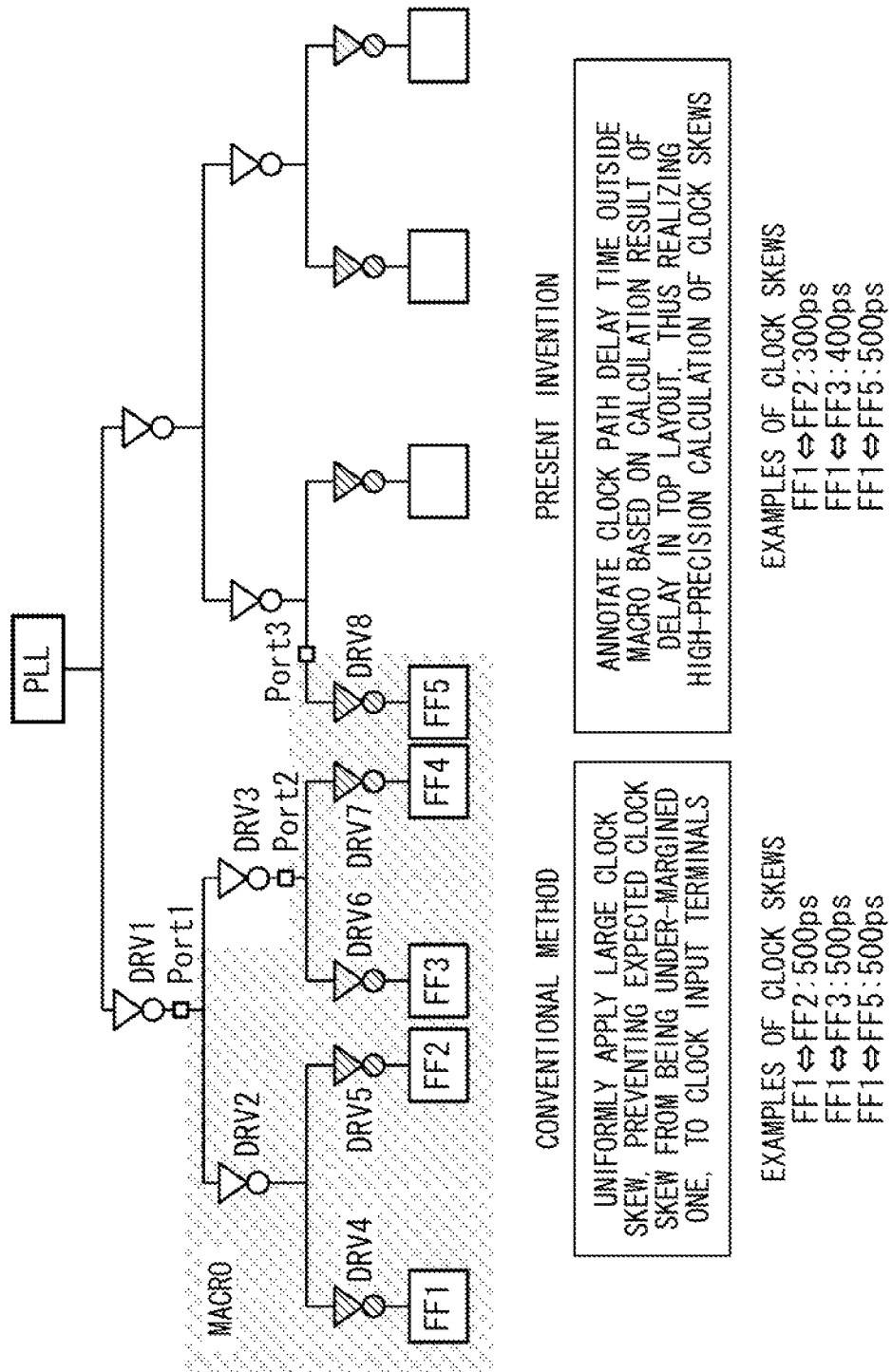
FIG. 7 shows the outline of the delay analysis processing of the first embodiment in terms of effects.

FIG. 7 shows the outline of the delay analysis processing executed by the delay analysis device in terms of effects.

The conventional macro delay analysis uniformly applies a large clock skew, preventing an expected clock skew from being under-margined one, to clock input terminals of flip-flops or external clock input terminals. In actuality, different clock skews (i.e. various differences of delay times occurring at start points of clock paths) may appear dependent upon the layout of clock paths representing the number of branches of clock drivers or the like. That is, small clock skews may appear in clock paths whose layouts are similar to each other and which start from flip-flops, while large clock skews may appear in clock paths whose layouts are quite different from each other. Referring to FIG. 7, a relatively long common path is shared between a clock path leading from PLL to FF1 and a clock path leading from PLL to FF2, while a relatively short common path is shared between the clock path leading from PLL to FF1 and a clock path leading from PLL to FF5, so that a clock skew between FF1 and FF2 is smaller than a clock skew between FF1 and FF5.

Since the conventional macro delay analysis applies a large clock skew, preventing an under-margined condition, to clock input terminals of flip-flops or the like, it actually analyzes an over-margined delay time with respect to a data timing path between FF1 and FF2.

In contrast, the macro delay analysis of the present embodiment annotates clock path delay times outside a macro based on the calculation result of delay times in the top layout; hence, it is possible to realize a high-precision calculation of clock skews in light of clock paths and layouts. That is, the present embodiment calculates a small clock skew between FF1 and FF2 owing to a small difference between the clock path leading from PLL to FF1 and the clock path leading from PLL to FF2, even though there is a big difference between the clock path leading from PLL to FF1 and the clock path leading from PLL to FF5. Thus, it is possible to achieve high-precision delay analysis, which contributes to the optimum LSI design excluding excessive design margins.

2. Second Embodiment

Figure 8:
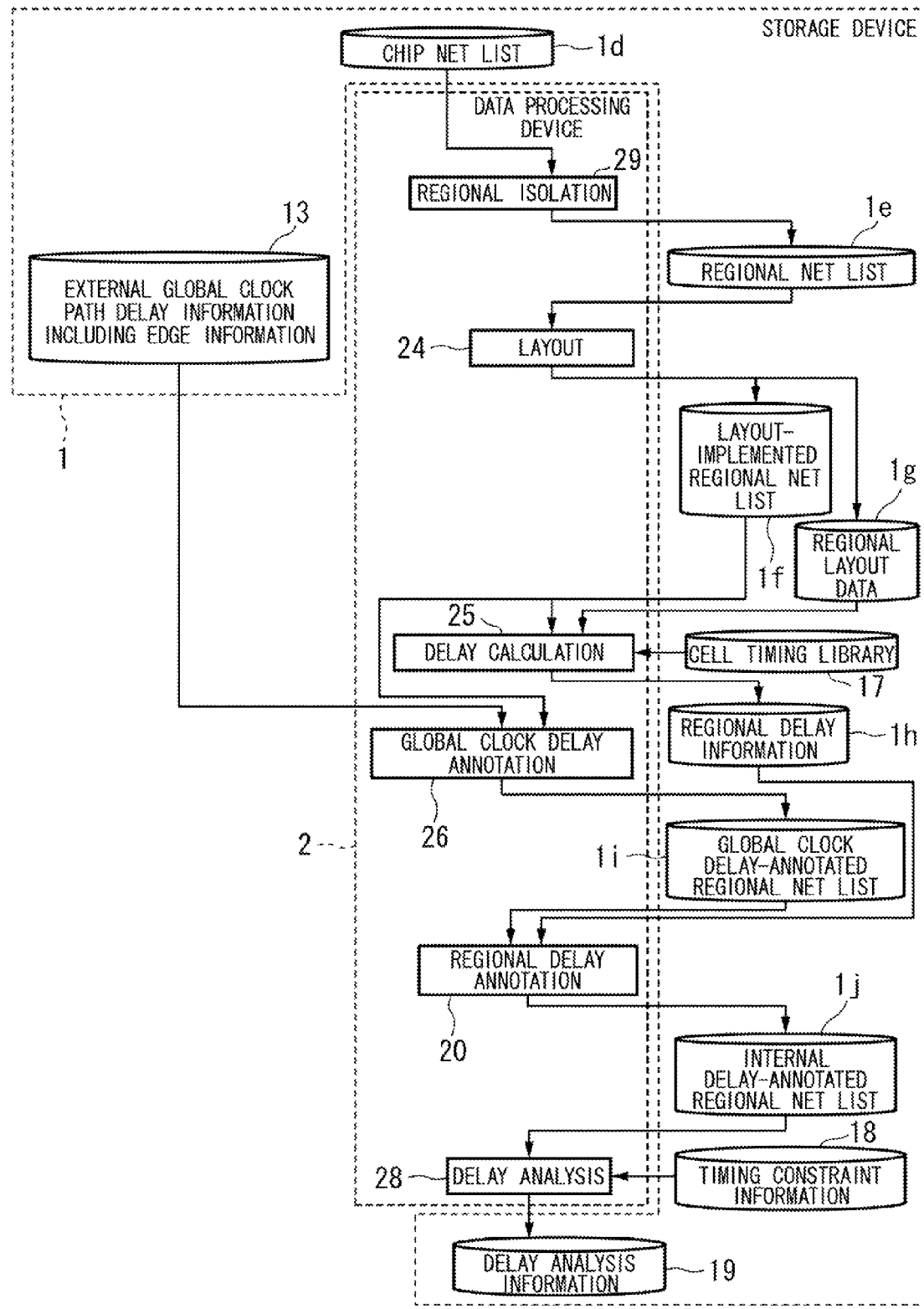
FIG. 8 is a block diagram showing a delay analysis device according to a second embodiment of the present invention.

Next, a delay analysis device according to a second embodiment of the present invention will be described in detail. FIG. 8 is a block diagram of the delay analysis device of the second embodiment, wherein parts identical to those shown in FIG. 1 are designated by the same reference numerals.

The delay analysis device of FIG. 8 is constituted of the storage device 1 (composed of a hard-disk unit or the like) and the data processing device 2 which operates in accordance with programs.

The storage device 1 stores files representing a chip net list 1d and an external clock path delay information 13 (in which the term "external" is meant to be outside an arbitrary region) including the edge information as well as the cell timing library 17 and the timing constraint information 18. The storage device 1 stores files representing the output information such as a regional net list 1e, a layout-implemented regional net list 1f, regional layout data 1g, regional delay information 1h, a global clock delay-annotated regional net list 1i, and a regional delay-annotated net list 1j as well as the delay analysis information 19, wherein the term "regional" is meant to be within an arbitrary region.

The chip net list 1d is output from a layout tool after completion of wiring and layout of cells on the entire surface of a chip.

The regional net list 1e is a net list of an arbitrary region extracted from the chip net list 1d.

The layout-implemented regional net list 1f is produced by modifying the layout of the regional net list 1e.

The regional delay information 1h represents wiring delays and gate delays of an arbitrary region per each network.

The global clock delay-annotated regional net list 1i is derived from the layout-implemented regional net list 1f, in which a first stage of a clock path of an arbitrary region is annotated by the global clock path delay information 13.

The regional delay-annotated net list 1j is derived from the global clock delay-annotated regional net list 1i, in which first and subsequent stages of clock paths and other circuits are annotated by the regional delay information 1h.

The other constituent elements 13, 17, 18 and 19 of the storage device 1 shown in FIG. 8 are identical to those of the storage device 1 shown in FIG. 1.

The data processing device 2 is constituted of a regional delay annotation unit 20 and a regional isolation unit 29 as well as the layout unit 24, the delay calculation unit 25, the global clock delay annotation unit 26, and the delay analysis unit 28.

The regional isolation unit 29 inputs the chip net list 1d so as to output the regional net list 1e with regard to an arbitrarily isolated region.

The global clock delay annotation unit 26 inputs the layout-implemented regional net list 1f and the global clock path delay information 13 including the edge information so as to output the global clock delay-annotated regional net list 1i, in which an initial stage of an arbitrary region is annotated by the delay information extracted from the global clock path delay information 13 including the edge information. Considering inverts serving as clock cells, rise/fall edges of a clock signal differ dependent upon the number of clock cells in an arbitrary region; hence, it is necessary to annotate the edge information in addition to the delay information on a clock path.

The regional delay annotation unit 20 inputs the global clock delay-annotated regional net list 1*i* and the regional delay information 1*h* so as to output the regional delay-annotated net list 1*j*, in which first and subsequent stages of clock paths and other circuits are annotated by the delay information of an arbitrary region.

The other constituent elements 24, 25 and 28 of the data processing device 2 shown in FIG. 8 are identical to those of the data processing device 2 shown in FIG. 1.

Figure 9:
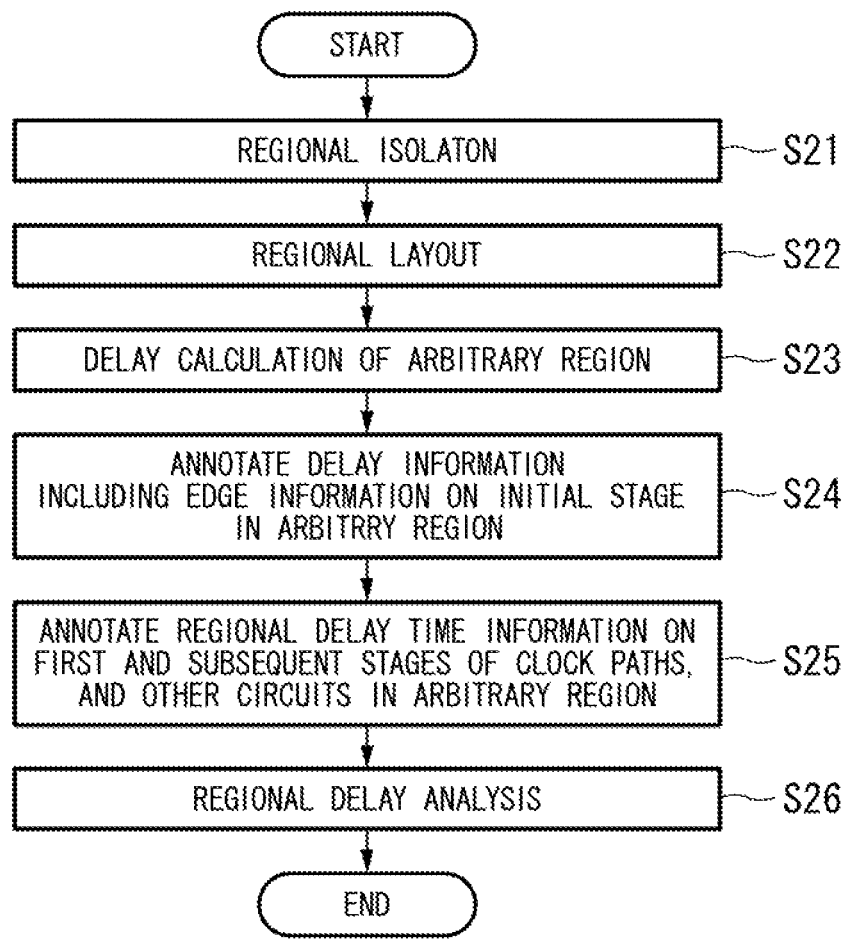
FIG. 9 is a flowchart showing delay analysis processing according to the second embodiment.

FIG. 9 is a flowchart showing the delay analysis processing executed by the delay analysis device of FIG. 8. Next, procedures for verifying the operational timing of an arbitrary region will be described with reference to FIG. 9.

(Step S21)

Figure 10:
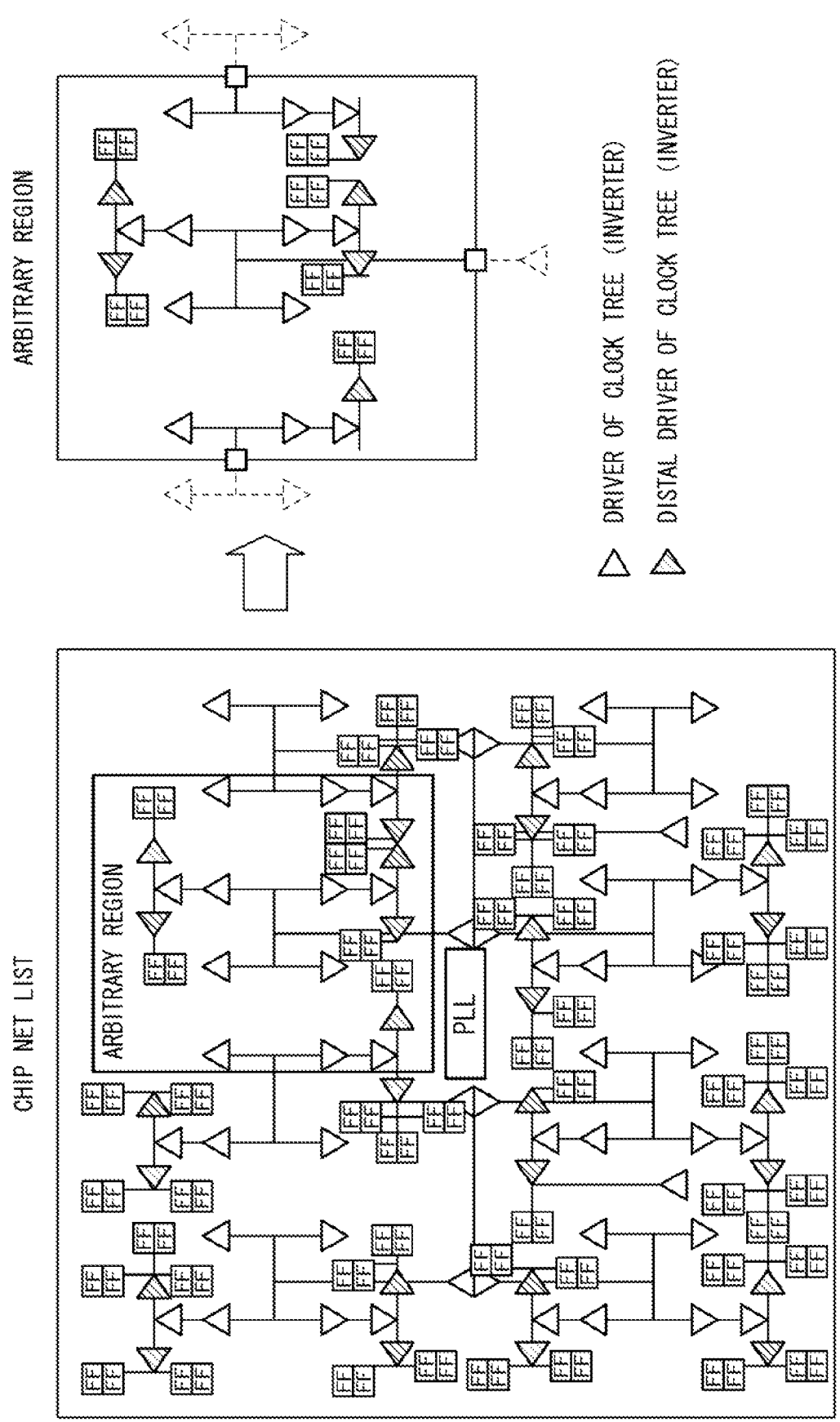
FIG. 10 shows the outline of the delay analysis processing of the second embodiment.
Figure 11:
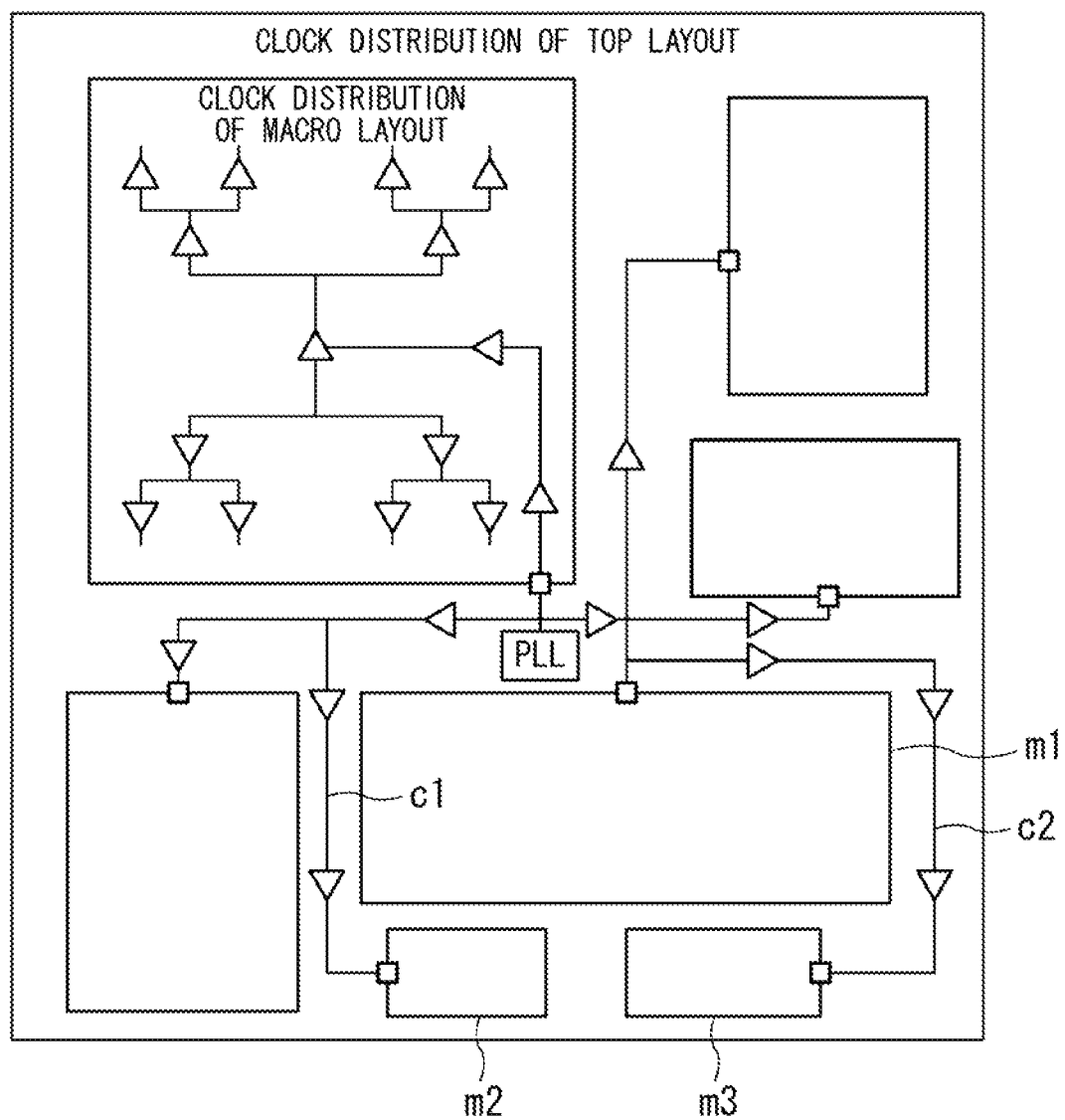
FIG. 11 shows a conventionally-known clock distribution method in connection with a top layout and a macro layout of an LSI chip.

The regional isolation unit 29 inputs the chip net list 1*d* so as to output the regional net list 1*e* with regard to an arbitrarily isolated region. Since the chip net list 1*d* already subjected to chip layout physically recognizes clock paths, external clock terminals of an arbitrary region are disposed at intersecting points between a regional boundary and clock paths, so that the arbitrary region including external clock terminals are being isolated (see FIG. 10). Other procedures other than the regional isolation using external clock terminals can be realized by techniques disclosed in Patent Document 13. In this connection, a specific prefix is added to an instance name of a first stage of a clock cell so that the first stage of the clock cell can be easily discriminated in an arbitrary region.

(Step S22)

The layout unit 24 inputs the regional net list 1*e* so as to output the layout-implemented regional net list 1*f* and the regional layout data 1*g*. The details of step S22 can be realized by techniques disclosed in Patent Document 14, Patent Document 15, and Patent Document 16.

(Step S23)

The delay calculation unit 25 inputs the layout-implemented regional net list 1*f* and the regional layout data 1*g* so as to perform delay calculation via an RC simulation with reference to the cell timing library 17, thus outputting the regional delay information 1*h*. The details of step S23 can be realized by techniques disclosed in Patent Document 2, Patent Document 4, Patent Document 5, and Patent Document 6.

(Step S24)

The global clock delay annotation unit 26 inputs the layout-implemented regional net list 1*f* and the global clock path delay information 13 including the edge information so as to output the global clock delay-annotated regional net list 1*i*. Thus, it is possible to annotate the global clock path delay information 13 including the edge information on an initial stage of an arbitrary region. Specifically, a global clock path delay time for the initial stage of an arbitrary region is annotated as a delay time of a path leading from a cutout portion of an arbitrary region to a first stage of a clock path in an arbitrary region.

Specifics of steps S25 and S26 are essentially identical to those of steps S17 and S18 of the first embodiment except for the distinction between the macro and the arbitrary region and the distinction between the global clock distribution-implemented top net list 12 and the chip net list 1*d*.

(Step S25)

The regional delay annotation unit 20 inputs the global clock delay-annotated regional net list 1*i* and the regional delay information 1*h* so as to output the regional delay-annotated net list 1*j*. Thus, it is possible to annotate the regional delay information 1*h* on second and subsequent stages of clock paths and other circuits in an arbitrary region. In short, it is possible to annotate the delay information entirely on the arbitrary region.

(Step S26)

The delay analysis unit 28 inputs the regional delay-annotated net list 1*j* and the timing constraint information 18 (which are annotated by the delay information in steps S24 and S25) so as to calculate delay times of signal paths, delay times of a clock path, and clock skews in light of clock delay times outside an arbitrary region, and to check whether or not the relationship between delay times of signal paths and delay times of clock paths meets the timing constraint, thus outputting the delay analysis information 19. Herein, clock delay times retain delay times of a clock path in the top layout, i.e. delay times occurring in paths from PLL to the first stage of driver of a clock tree in an arbitrary region; hence, it is possible to accurately calculate clock skews in the regional layout similar to the top layout. Regional delay analysis is performed using high-precision clock skews so as to produce the delay analysis information 19. Regional delay analysis is also performed on edges of a clock signal by use of the correct information. Thus, it is possible to complete the regional delay analysis.

In the macro delay analysis on one of subdivisions of the hierarchical architecture of the LSI circuitry or the regional delay analysis on an arbitrary region isolated from a chip layout, clock paths of a macro or arbitrary region are each annotated by the delay information of clock paths obtained in the chip layout or the top layout handling a macro or arbitrary region as a black box. Thus it is possible to preclude excessive design margins, which cannot be precluded in the conventional macro delay analysis or the conventional regional delay analysis, thus achieving the optimum LSI design.

The delay analysis device for analyzing semiconductor integrated circuits incorporates a microcomputer (or a computer system); hence, the aforementioned procedures and steps are stored in computer-readable storage media in the form of programs. The delay analysis device is able to implement the macro/regional delay analysis as the microcomputer loads and executes programs of computer-readable storage media. Computer-readable storage media refer to magnetic disks, magneto-optical disks, CD-ROM, DVD-ROM, and semiconductor memory. Alternatively, it is possible to distribute programs to the microcomputer of the delay analysis device, which is thus able to execute programs.

Programs can be drafted to implement a part of the function of the present embodiment(s). Alternatively, programs can be drafted as difference files (or difference programs), which are merged with preset programs already installed in the microcomputer, thus implementing the entire function of the present embodiment(s).

Lastly, the present invention is not necessarily limited to the first and second embodiments, which can be further modified within the scope of the invention as defined in the appended claims.

What is claimed is:

1. A delay analysis device for analyzing a delay property of a chip with reference to a cell timing library, said delay analysis device comprising:
   a processor and a memory;
   a global clock distribution unit that distributes at least one clock path toward an entire surface of the chip including an internal area of a macro based on a top netlist input thereto, thus producing a global clock distribution-implemented top netlist and global clock layout data;

a region extraction unit which inputs the global clock distribution-implemented top netlist and outputs a region netlist of a region in a chip;

a layout unit which inputs the region netlist to perform a layout process and outputs a layout-completed region netlist and region layout data;

a delay calculation unit that performs RC simulation to calculate a delay time with respect to a specific region of the chip based on the cell timing library, the regional layout data and the layout-completed regional netlist, representing the specific region of the chip associated to the global clock distribution-implemented top netlist, thus producing regional delay information;

a global clock delay annotation unit that annotates a clock path by global clock path delay information including edge information input thereto with respect to an initial stage of the specific region of the chip, thus producing a global clock delay-annotated regional netlist;

a regional delay annotation unit that produces a regional delay-annotated regional netlist based on the global clock delay-annotated regional netlist including the clock path annotated by global clock path delay information including the edge information input thereto with respect to the initial stage of the specific region of the chip and the regional delay information; and a delay analysis unit that inputs timing constraint information in connection with the regional delay-annotated regional netlist to calculate a delay time of a signal path, a delay time of the clock path, and a clock skew, the delay analysis unit further checking whether or not a relationship between the delay time of the signal path and the delay time of the clock path meets the timing constraint information, thus producing delay analysis information.

2. The delay analysis device according to claim 1 further comprising:

a secondary delay calculation unit that performs RC simulation to calculate a delay time based on the global clock-distributed top netlist and the global layout data with reference to the cell timing library, thus producing global clock path delay information;

a regional isolation unit that produces the regional netlist based on the global clock distribution-implemented top netlist.

3. A delay analysis method for analyzing a delay property of a chip with reference to a cell timing library, said delay analysis method comprising:

distributing at least one clock path toward an entire surface of the chip including an internal area of a macro based on a top netlist input thereto, thus producing a global clock distribution-implemented top netlist and global clock layout data; inputting the global clock distribution-implemented top netlist and outputting a regional netlist of a region of a chip;

receiving the regional netlist to perform a layout process and outputting a layout-completed regional netlist and regional layout data;

performing, by a processor, RC simulation to calculate a delay time with respect to a specific region of the chip based on the cell timing library, the regional layout data and the layout-completed regional netlist, representing the specific region of the chip associated to the global clock distribution-implemented top netlist, thus producing regional delay information;

annotating a clock path by the global clock path delay information including edge information input thereto with respect to an initial stage of the specific region of the chip, thus producing a global clock delay-annotated regional netlist;

producing a regional delay-annotated netlist based on the global clock delay-annotated regional netlist including the clock path annotated by global clock path delay information including the edge information input thereto with respect to the initial stage of the specific region of the chip and the regional delay information;

inputting timing constraint information in connection with the regional delay-annotated regional netlist to calculate a delay time of signal path, a delay time of the clock path, and a clock skew; and checking whether or not a relationship between the delay time of the signal path and the delay time of the clock path meets the timing constraint information, thus producing delay analysis information.

4. A non-transitory storage medium storing a delay analysis program, executable by a computer, to implement a delay analysis method for analyzing a delay property of a chip, said delay analysis method comprising:

distributing at least one clock path toward an entire surface of the chip including an internal area of a macro based on a top netlist input thereto, thus producing a global clock distribution-implemented top netlist and global clock layout data inputting the global clock distribution-implemented top netlist and outputting a regional netlist of a region of a chip receiving the regional netlist to perform a layout process and outputting a layout-completed regional netlist and regional layout data;

performing RC simulation to calculate a delay time with respect to a specific region of the chip based on the cell timing library, the regional layout data and the layout completed regional netlist, representing the specific region of the chip associated to the global clock distribution-implemented top netlist, thus producing regional delay information;

annotating a clock path by global clock delay information including edge information input thereto with respect to an initial stage of the specific region of the chip thus producing a global clock delay-annotated regional netlist;

producing a regional delay-annotated netlist based on the global clock delay annotated regional netlist including the clock path annotated by global clock pat delay information including the edge information input thereto with respect to the initial stage of the specific region of the chip and the regional delay information;

inputting timing constraint information in connection with the regional delay-annotated regional netlist to calculate a delay time of a signal path, a delay time of the clock path, and a clock skew; and checking whether or not a relationship between the delay time of the signal path and the delay time of the clock path meets the timing constraint information, thus producing delay analysis information.

* * * * *